Patented Aug. 30, 1938

2,128,851

UNITED STATES PATENT OFFICE 2,128,851

THEOPHYLLINE-PIPERAZINE PREPARATIONS

Karl Rimböck, Vienna, Austria

No Drawing. Application June 2, 1937, Serial No. 146,121. In Austria June 2, 1936

1 Claim. (Cl. 167—67)

This invention relates to the production of pharmaceutical solutions, and more particularly to the preparation of joint solutions of theophylline and piperazine, which are capable of being kept without decomposing, and of being sterilized.

It has long been known to prepare a double compound from theophylline, which is valuable in itself as a diuretic, and piperazine, which in itself exerts a dissolving action on uric acid, this compound being soluble in cold water, by causing piperazine to act upon theophylline either in an amount corresponding to equimolecular proportions or in an amount slightly less than that corresponding to equimolecular proportions. For this purpose the constituents may be allowed to act upon each other undiluted or in a solvent. Alternatively, salts of the two constituents may be used as starting materials.

Exhaustive tests show that, using the above-mentioned known compound, it is also possible to obtain other than purely aqueous solutions. I have found that by utilizing a glucose solution, preferably of 20% strength, there may be obtained solutions of theophylline which are capable of being kept without decomposing, and which are susceptible of sterilization.

It was by no means obvious or to be expected that on the joint basis of theophylline and piperazine solutions of high therapeutic efficicacy other than purely aqueous solutions could be obtained. This applies in regard to the use of glucose solution as medium, for the reason that when diamines other than piperazine, for example ethylene diamine, are used there are invariably obtained solutions which discolor brown and crystallize out spontaneously, and which more particularly do not admit of sterilization, even under the mildest conditions, since glucose is too vigorously attacked thereby. That this is the case is also demonstrated by the fact that among the theophylline preparations in solution hitherto known to commerce there is no combination with grape sugar. The preparations hitherto produced for example with ethylene diamine are put on the market in two ampules of which the one contains the theophylline solution while the other contains the glucose solution. It has not hitherto been possible to supply both in one and the same ampule. This apparently has to do with the hitherto unrecognized property of piperazine as a secondary diamine as compared with the property of primary diamines that, while theophylline may still be kept in solution by piperazine, glucose is not thereby attacked.

I have further discovered the surprising fact that a joint solution of theophylline and piperazine in glucose solution is capable of yielding a stable solution with an addition of strophanthine (which in itself is not stable in alkaline media), with the result that particularly favorable conditions are provided for the administration thereof. The resulting solutions are, like the glucose solution of theophylline, capable of being kept without decomposition, and of being sterilized.

The literature on the subject states that a pH of 6–8 is the optimum for the keeping properties of strophanthine solutions. The production thereof consists in condensing theophylline and piperazine in a known manner to a double compound, dissolving this compound in a glucose solution preferably of 20% strength, and then sterilizing; or alternatively, the individual constituents are brought into solution, the molecular proportions being preferably at least 1 mol. of theophylline to ¾ mol. of piperazine.

Example 0.2000 g. of theophylline,
0.1500 g. of piperazine, and
0.0002 g. of strophanthine are dissolved in a 20% glucose solution to make up 10 ccs. of solution.

The strictest tests have shown that the solutions obtained in this manner are stable. In particular it has transpired that the specified composition is such that the strophanthine does not lose in efficacy even when the preparations are stored for a long time. From pharmacological tests made in accordance with the Hatcher method adopted as standard by the League of Nations it has been found, that, even after storing for 14 months, the efficacy of the strophanthine present in the injections remains unaltered. The pH values remain unaltered at about 8.4 to 8.6.

I claim:

A pharmaceutical preparation comprising an aqueous alkaline solution of strophanthine, glucose, and theophylline containing piperazine in an amount sufficient to stabilize the solution against decomposition, said solution being capable of being sterilized.

KARL RIMBÖCK.